United States Patent

Savage

[15] 3,665,593

[45] May 30, 1972

[54] METHOD AND APPARATUS FOR MANUFACTURE OF A SQUIRREL CAGE ROTOR

[72] Inventor: Jack W. Savage, Centerville, Ohio

[73] Assignee: General Motors Corporation, Detroit, Mich.

[22] Filed: Apr. 7, 1970

[21] Appl. No.: 26,242

[52] U.S. Cl..................................................29/598, 72/354
[51] Int. Cl...................................H02k 15/02, H02k 15/085
[58] Field of Search......................29/598, 463, 470.5; 72/354

[56] References Cited

UNITED STATES PATENTS

| 3,093,888 | 6/1963 | Huguley | 29/598 |
| 2,125,970 | 8/1938 | Waters | 29/598 |
| 3,371,410 | 3/1968 | Gintovt | 29/598 X |
| 3,469,309 | 9/1969 | Sagalow | 29/598 |
| 3,496,632 | 2/1970 | Deming et al. | 29/598 |
| 2,996,791 | 8/1961 | Hicks | 29/598 |
| 3,191,270 | 6/1965 | Martin et al. | 29/598 |

*Primary Examiner*—Theron E. Condon
*Assistant Examiner*—Horace M. Culver
*Attorney*—E. W. Christen, C. R. Meland and Richard G. Stahr

[57] ABSTRACT

A method and apparatus is provided for manufacturing a squirrel cage winding assembly of a squirrel cage rotor from a pair of hollow cylindrical aluminum slugs wherein the pair of slugs are extruded into opposite ends of the winding slots of a rotor core. Conductor bars are formed in the slots by the extruded slug material and conductive end rings are formed integrally therewith by terminal portions of each slug.

3 Claims, 5 Drawing Figures

PATENTED MAY 30 1972 3,665,593

INVENTOR.
Jack W. Savage
BY Robert W. Smith
ATTORNEY

METHOD AND APPARATUS FOR MANUFACTURE OF A SQUIRREL CAGE ROTOR

This invention relates to the manufacture of dynamo-electric machines having squirrel cage rotors and more particularly to a method and apparatus for assembling a squirrel cage winding assembly to a rotor core by an extrusion process.

In the manufacture of squirrel cage rotors for electric induction motors, various techniques have been employed for fabricating and assembling conductive end rings to the ends of the bar windings. In one method, solid bars of conductive material are inserted into the slots. Expensive machining and assembling apparatus are required and it is difficult to fill the slots since they are usually skewed. In this method, end rings are usually cast on the opposite ends of the bars in a separate manufacturing step. In a widely employed method, squirrel cage windings are formed by die casting a conductive metal such as aluminum to a rotor core. Conductor bars and conductive end rings can be formed concurrently in accordance with known casting techniques. For example, end ring molds having annular cavities are placed at the ends of the rotor core to receive the molten casting material as it is cast into the rotor slots so that the conductor bars and end rings are formed at the same time.

Casting techniques are often troublesome because they involve handling and working of hot molten metal in casting machines which are sometimes elaborate and expensive. One of the chief difficulties found in forming windings by casting methods is maintaining the purity of the cast metal. Voids are produced by entrapment of air caused by turbulence during the casting operation and by bubbles which are formed from dissolved gases such as hydrogen. Shrinkage cracks are also formed when the casting cools because of changes in density between the molten state and the solid state.

The non-homogeneous castings produce undesirable electrical performance characteristics in the cast rotor windings. For example, a substantial decrease in the electrical conductivity of the conductive metal has been noted following casting. The castings are sometimes faulty and not uniform and must be rejected as failing production and reliability specifications. Also, the cast rotor windings and end rings are often unbalanced and non-symmetrical so as to require extensive balancing and machining operations to correct for the defects in the casting.

In the present invention for a method and apparatus of manufacturing a squirrel cage rotor, a squirrel cage winding assembly is fabricated to a laminated rotor core having a plurality of winding slots by an extrusion process. The rotor core is mounted in an extrusion press assembly and a pair of hollow cylindrical aluminum slugs are positioned adjacent the opposite ends thereof. The pairs of slugs are heated to an elevated temperature which is below the melting temperature and a hydraulically operated ram extrudes the slugs into the opposite ends of the winding slots of the rotor core. The extruded material of each slug flows into the slots and is bonded together therein to form integral conductor bars. Conductive end rings are formed by unextruded terminal portions of each of the pair of slugs which extend from the opposite ends of the rotor core.

A primary object of this invention is to provide an improved method and apparatus for fabricating squirrel cage rotors wherein a pair of hollow conductive slugs are extruded into both ends of winding slots of a rotor core to form conductor bar windings therein.

A further object of this invention is to provide an economical and reliable method and apparatus for fabricating conductor bar windings and integral conductive end rings of a squirrel cage winding assembly which has reduced defects and increased purity by heating and extruding a pair of hollow cylindrical conductive slugs through both ends of the winding slots of a rotor core.

A still further object of this invention is to provide a method and apparatus for fabricating conductor bars and integral end rings to a rotor core by extruding a pair of hollow cylindrical aluminum slugs through both ends of the winding slots of a rotor core so as to form integral conductor bars therein and further wherein said conductor bars are provided integral with unextruded terminal portions of the hollow slugs so as to provide conductive end rings at opposite ends of the rotor core.

Further objects and advantages of the present invention will be apparent from the following description, reference being had to the accompanying drawing in which a preferred embodiment of the apparatus and method of operation of the present invention is illustrated.

Figure 5:
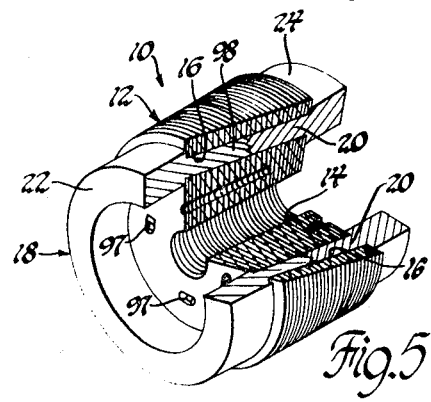
FIG. 5 is a perspective view, partially sectioned and broken away, of a squirrel cage rotor manufactured in accordance with the present invention.

Referring now to the drawings, FIG. 5 illustrates a typical squirrel cage rotor 10 made by the method and apparatus of the present invention for use in an induction motor type of dynamoelectric machine. The squirrel cage rotor 10 includes a cylindrical rotor core 12 formed by a stack of circular disk laminations made of a magnetic iron material. The rotor core 12 includes a center opening 14 which is mounted to a motor shaft. The outer periphery includes a circumferential series of axially extending winding slots 16 disposed adjacent the outer diameter thereof. The winding slots 16 extend in a skewed or inclined relationship with respect to the ends of the rotor core 12.

A squirrel cage winding assembly 18 is fabricated in accordance with this invention to the rotor core 12. A series of bar windings is provided by a plurality of conductor bars 20 which fill the winding slots 16. A pair of conductive end rings 22 and 24 are provided at the ends of the conductor bars 20. Each of the end rings 22 and 24 is integral with the respective ends of conductor bars 20 so as to electrically interconnect and provide short circuiting conductive paths at the ends of the bar windings provided by conductor bars 20.

FIGS. 1 through 4 illustrate an extrusion press assembly 30 for fabricating the squirrel cage winding assembly 18. A pair of metal slugs 32 and 34, illustrated in FIG. 1 positioned within the extrusion press assembly 30, provide the conductive material for forming the squirrel cage winding 18. The slugs 32 and 34 are made of an electrically conductive material and are mounted adjacent the opposite ends of the rotor core 12, as described more fully hereinbelow. The slugs 32 and 34 have substantially identical predetermined hollow cylindrical shapes and are formed from a commercially available grade of substantially pure aluminum. Other conductive metals such as copper may be used where different characteristics for the squirrel cage winding assembly 18 are desired.

The component parts of the extrusion press assembly 30 include a container 38 provided by a pair of identical guide blocks 40 and 42. The guide blocks are coaxially aligned and spaced apart by a rotor mounting block 46. The guide blocks 40 and 42 and the mounting block 46 are illustrated in vertical alignment although it is to be understood the parts may be aligned horizontally, for example, if desired.

The mounting block 46 includes flat, parallel ends 50 and 52. The height between the ends 50 and 52 is substantially equal to or slightly less than the height of the rotor core 12. A circular bore 54 extends axially through the ends 50 and 52 providing a cylindrical wall which receives a rotor core 12. The diameter of the cylindrical wall corresponds to the diameter of the rotor core 12 so that there is a force fit between the outer diameter of the rotor core 12 and the cylindrical wall. Accordingly, the rotor core 12 is placed in the mounting block 46 by being pressed into the bore 54.

Figure 4:
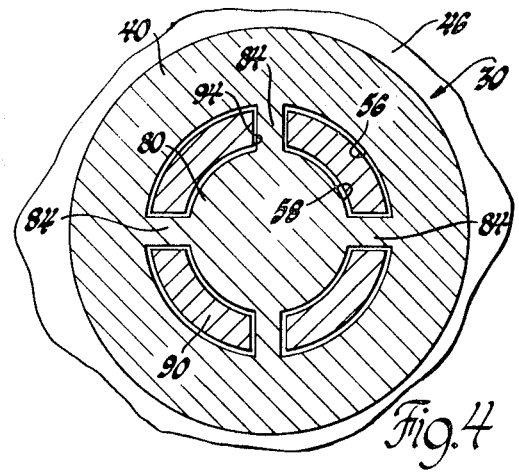
FIG. 4 is a sectional end view of the extrusion press assembly of FIG. 2 taken along lines 4—4 and looking in the direction of the arrows.

The guide blocks 40 and 42 include axially extending annular openings formed between outer and inner pairs of cylindrical walls 56 and 58 and 62 and 64, respectively. These pairs of cylindrical walls define identical annular extrusion chambers 68 and 70, respectively. The extrusion chambers 68 and 70 extend from the inner axial ends 74 and 76 of the guide blocks 40 and 42 and are coaxially aligned with each other and the winding slots 16 of the rotor core 12 when it is positioned in the mounting block 46. The inner cylindrical walls 58 and 64 form mandrel portions 80 and 82 which are integral with the guide blocks 40 and 42. The outer axial ends of the mandrel portions 80 and 82 are connected with the guide blocks by bridging sections 84 as shown in FIG. 4.

The radial spacing between the outer and inner pairs of cylindrical walls 56 and 58 and 62 and 64, respectively, is slightly longer than the radial height of the end openings of the winding slots 16. The slugs 32 and 34 are contained between the cylindrical walls of the extrusion chambers 68 and 70 so as to have a sliding fit.

Annular pistons 86 and 88 are disposed within the outer axial ends of the extrusion chambers 68 and 70 and are actuated by a pair of ram extensions 90 and 92, respectively. The inner and outer diameters of the annular pistons 86 and 88 have a substantially tight sliding fit between the adjacent cylindrical walls 56 and 58 and 62 and 64, respectively. Each of the ram extensions 90 and 92 include slotted end openings 94 and 96 which slide over the bridging sections 84 extending across the outer axial ends of the extrusion chambers 68 and 70. The ram extensions engage the outer axial ends of the pistons 86 and 88 and are connected to a hydraulic press which applies the extrusion forces to the slugs 32 and 34.

The inner axial ends 74 and 76 of the guide blocks 40 and 42 engage the flat ends 50 and 52, respectively, of the mounting block 46 and the outer peripheries of the ends of the rotor core 12. The axial ends of the mandrel portions 80 and 82 provide extensions of the ends 74 and 76 for engaging the centers of the rotor core 12. Therefore, the inner axial ends 74 and 76 provide axial mounting support for the ends of the rotor core.

The extrusion press assembly 30 is held together by a clamping apparatus including a press, not shown, which clamps the inner axial ends 74 and 76 of the pair of guide blocks 40 and 42 to the ends 50 and 52 of the mounting block 46. The component parts are held in coaxial alignment and form sealed joints between the engaging surfaces of guide blocks 40 and 42 and mounting block 46 and also between guide blocks 40 and 42 and rotor core 12. Clamping of the extrusion press assembly 30 permits faster assembly and disassembly of the component parts than does the use of bolts extending through the component parts.

Referring now to the method of manufacture of my invention, the operation of the extrusion press assembly 30 is described hereinafter. The rotor core 12 is fabricated prior to being mounted in the extrusion press assembly 30 in accordance with the rotor core and apparatus for assembly disclosed in U.S. Pat. No. 3,110,831 to Zimmerle issued Nov. 12, 1963 and assigned to the assignee of this invention. The rotor core 12 is formed of a plurality of circular disk laminations having center holes for forming the center opening 14 and circumferentially spaced slot openings disposed adjacent the outer periphery of the laminations for forming the winding slots 16. The laminations further include offset segments 97 which interlock with adjacent laminations when the stack is axially compressed.

Prior to the laminations being compressed, the slot openings are oriented so that the circumferential series of winding slots 16 are formed at a skew angle of eighteen to twenty degrees relative to the core longitudinal axis. Each lamination is rotated slightly relative to the adjacent lamination so that the edges of the slot openings of one lamination extends slightly over the openings of an adjacent lamination. Thus, the winding slots 16 are formed so as to extend at an angle between the ends of the rotor core 12. The stack is then axially compressed so that the offset segments 97 are interlocked within a complementary opening left by an offset segment of an adjacent lamination to form the laminations into an integral laminated assembly forming the rotor core 12.

The dimensions of the rotor core 12 illustrated in FIG. 5 are described hereinafter for purposes of illustrating the present invention. The rotor core has a diameter of approximately 2.625 inches, a height of approximately 1.375 inches and a circumferential series of thirty winding slots 16. Each slot opening of the laminations has a radially extending height of approximately 0.22 inch and a width of 0.09 inch. Accordingly, the total volume of the winding slots 16 is approximately 2.0 cubic inches.

After the rotor core 12 is assembled, it is mounted in the rotor mounting block 46 by being pressed into circular bore 54. The mounting block 46 and rotor core 12 are then ready for mounting in the extrusion press assembly 30 and between the guide blocks 40 and 42.

The metal slugs 32 and 34 provided for positioning into the extrusion chambers 68 and 70 have a predetermined hollow cylindrical shape. The size of the metal slugs 32 and 34 is determined by the volume of conductive material required to form conductive bars 20 and the end rings 22 and 24 of the squirrel cage winding assembly 18. Accordingly, this determines the cross-sectional area and the height of the slugs 32 and 34. The volume of the slugs must be sufficient to fill the aforementioned volume of the winding slots 16 and also leave predetermined unextruded terminal portions at the ends of each of the slugs 32 and 34 when the slots are filled. The terminal end portions are substantially identical and provide the conductive end rings 22 and 24 having outer diameters of approximately 2.6 inches, inner diameters of approximately 1.5 inch and heights of approximately 0.5 inch.

A typical size of the hollow cylindrical metal slugs 32 and 34 used for manufacturing the rotor core 10 includes an outside cylindrical surface having a diameter of approximately 2.5 inches and inner cylindrical surface having a diameter of approximately 2.0 inches and a height of approximately 1.125 inch. The slugs are made of a commercially available pure (99.75 percent minumum) aluminum material having a melting point of approximately 1,250° F. Each slug weighs approximately 94 grams.

The slugs 32 and 34 are positioned into the inner axial openings of the extrusion chambers 68 and 70 of the guide blocks 40 and 42 and adjacent the pistons 86 and 88. The guide blocks 40 and 42 are then clamped to the mounting block 46 by a suitable clamping means such as a hydraulic press. The ram extensions 90 and 92 are aligned with the outer axial ends of the pistons 86 and 88 respectively and each is connected to a source of extrusion force as provided by a hydraulic press.

The extrusion press assembly 30 is heated to a temperature below the melting point of the slugs 32 and 34 within an enclosed heating chamber mounted around the extrusion press assembly. A temperature range of 1,000° to 1,150° F. has been found suitable for substantially reducing the uniaxial flow resistance or stress for extruding the slug material by deforming it through the winding slots 16.

Pressure from the ram extensions 90 and 92 is applied to the pistons 88 and 90, respectively, and against the outer axial ends of the slugs 32 and 34. The temperature is maintained substantially within the temperature range of 1,000° to 1,150° F. While the extrusion force is applied from the ram extensions 90 and 92. It is important that the temperature does not exceed this range since the incipient melting point may be reached due to heat developed during extrusion of the slugs 32 and 34 through the winding slots 16.

Figure 2:
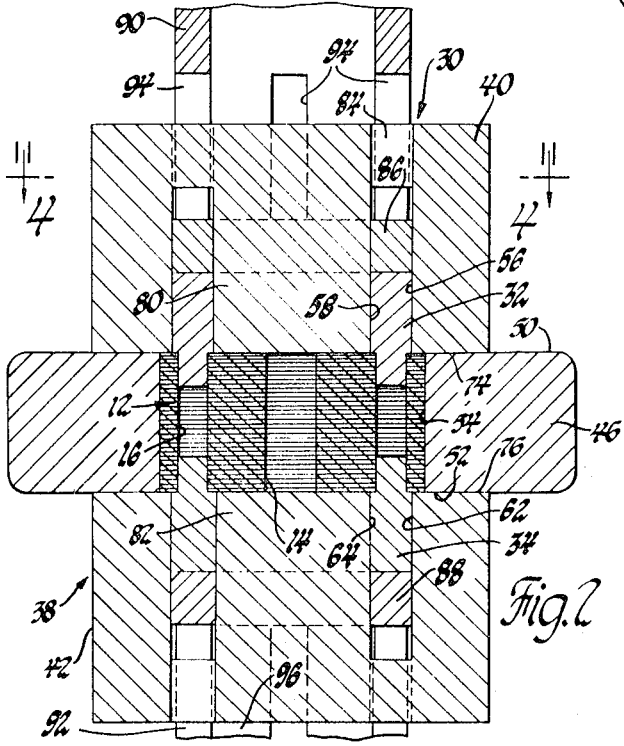
FIG. 2 is another view of the extrusion press assembly wherein the parts of the assembly have an intermediate operative position.

The extrusion force applied by each ram extension 90 and 92 relative to the end of the rotor core 12 is approximately 100,000 pounds. As illustrated in FIG. 2, this causes the slugs 32 and 34 to be deformed by the slot openings of the end laminations at opposite ends of the rotor core 12 and flow into the winding slots 16. The edges of these end slot openings effectively provide extrusion die surfaces. It has been found that the force of 100,000 pounds causes the slugs 32 and 34 to flow through the winding slots 16 at a rate of approximately three times faster than the rate at which the pistons 86 and 88 move within the extrusion chambers 68 and 70.

Figure 1:
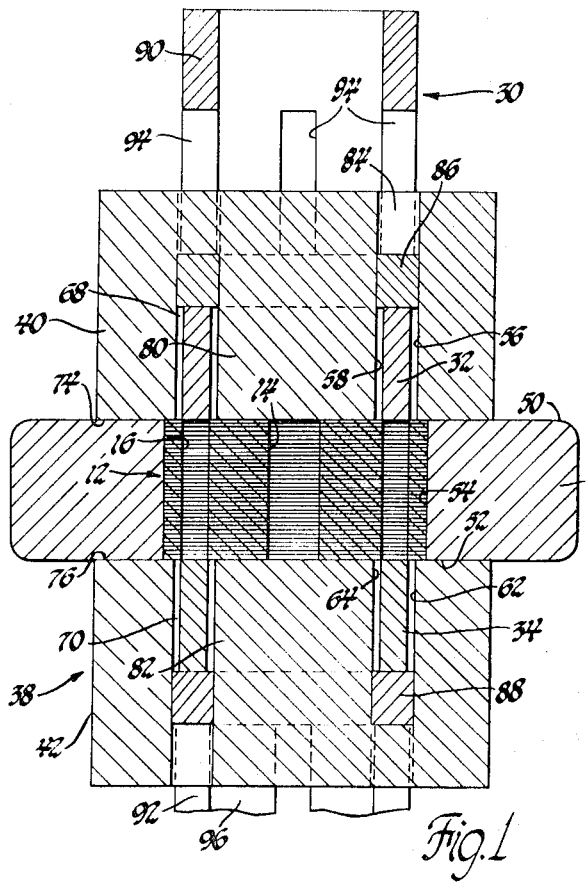
FIG. 1 is a sectional side elevational view of an extrusion press assembly used in the present invention.
Figure 3:
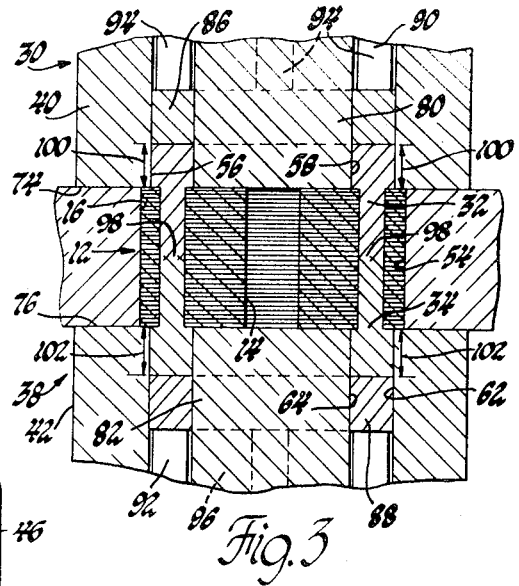
FIG. 3 is still another view of the extrusion press assembly of FIG. 1 wherein the parts of the assembly have a position corresponding to the final operative position of the assembly.

The extrusion forces of the ram extensions 90 and 92 continue until the extruded material of the two slugs 32 and 34 fills the winding slots 16 and is pressed together at the centers thereof as shown in FIG. 3. The extruded material of one slug is metallurgically bonded to the extruded material of the other slug so that an integral fusion bond 98 is formed therebetween. This forms the conductor bars 20 from the extruded material of each slug extending through the winding slots 16. After the fusion bond 98 is formed, the extrusion is terminated by releasing the ram extensions 90 and 92.

The aforementioned predetermined size of the slugs 32 and 34 will provide unextruded terminal end portions at the outer axial ends thereof. The terminal end portions extend within the spaces 100 and 102 of the inner axial openings of the extrusion chambers 68 and 70 between the ends of the rotor core 12 and the inner axial ends of the pistons 86 and 88. The unextruded terminal end portions of the slugs are radially deformed and widened slightly as they are pressed between the cylindrical walls of the extrusion chambers. These terminal end portions provide the conductive end rings 22 and 24 which are integral with the conductor bars 20 formed within the winding slots 16. The spaces 100 and 102 provided at the inner axial ends of the extrusion chamber provide the size of conductive end rings noted hereinabove for the squirrel cage rotor 10. Accordingly, the entire squirrel cage winding assembly 18 is formed in the extrusion press assembly 30 in the final operative position of the pistons 86 and 88 as illustrated in FIG. 3.

The press assembly 30 is disassembled by removing the ram extensions 90 and 92 and unclamping the guide blocks 40 and 42 from the ends of the mounting block 46. The rotor core 12 is pressed from the annular bore 54 of the rotor mounting block 46 and the completed rotor core 10 is provided as shown in FIG. 5. If desired, the shape of the conductive end rings 22 and 24 may be finished by machining steps or die forming operations so that the conductive end rings have a finished configuration other than that provided by the method and apparatus as disclosed hereinabove.

The conductive end rings 22 and 24 and conductor bars 20 formed by the method and apparatus of this invention are substantially free of voids, cracks and imperfections which are found in the conductor bars and end rings formed by casting processes. Molten aluminum which is cast in a rotor core normally cools at an uneven rate from the outer portion of the castings toward the center causing shrinkage and thermal stress cracking. Further defects are formed by voids caused by the turbulence of the molten casting material during casting and dissolved gases which form entrapped bubbles.

Undesirable electrical effects of the casting imperfections have been noted by measuring the conductivity of the aluminum conductor bars and end rings. Conductivity measurements of a squirrel cage winding assembly formed by extrusion was found to have a substantially higher conductivity than a winding assembly made by a casting process. Further, by visual and microscopic examination of cross-sections of an extruded squirrel cage winding assembly it was found to be substantially free of defects, cracks and voids when compared to those observed in the conductor bars and end rings formed by a casting process.

While the embodiment of the present invention as described hereinabove constitutes a preferred form, it is understood that other forms may be adopted without departing from the spirit of my invention.

What is claimed is as follows:

1. A method of manufacturing a squirrel cage rotor for fabricating conductor bar windings interconnected at each end by conductive end rings to a rotor core having a circumferential series of axial winding slots, the steps comprising: positioning said rotor core in an extrusion press having extrusion chambers communicating with opposite ends of said axial winding slots; placing hollow cylindrical slugs having predetermined heights and made of an electrically conductive material in said extrusion chambers with one slug adjacent to and abutting each end of said rotor core; heating said slugs to a temperature below the melting point of said electrically conductive material to reduce the flow resistance of said slug; extruding said slugs from said extrusion chambers axially into said axial winding slots; terminating said extruding when the extruded materials of said slugs are bonded together in said winding slots to form said conductor bar windings; and providing predetermined unextruded terminal portions in each of said slugs thereby forming said conductive end rings integrally connected with the ends of said conductor bar windings at the ends of said rotor core.

2. A method of manufacturing a squirrel cage rotor for fabricating conductor bar windings interconnected at each end by conductive end rings to a rotor core having a circumferential series of axial winding slots, the steps comprising: assembling a stack of laminations having circumferentially spaced slot openings aligned at a predetermined skew angle to form a rotor core having a circumferential series of axial winding slots; positioning said rotor core in an extrusion press having extrusion chambers communicating with opposite ends of said axial winding slots; providing a pair of hollow cylindrical slugs made of aluminum and having predetermined sizes for filling said axial winding slots and for forming said conductive end rings from terminal portions thereof; placing one of said pair of slugs in each of said extrusion chambers adjacent to and abutting each end of said rotor core; heating said pair of slugs to a predetermined temperature range below the melting point of said aluminum material to reduce the flow resistance of said slug; extruding said pair of slugs from said extrusion chambers axially into said axial winding slots; terminating said extruding when the extruded aluminum materials of said pair of slugs are bonded together in said axial winding slots to form said conductor bar windings; and providing said terminal portions by unextruded ends of each of said pair of slugs thereby forming said conductive end rings integrally connected with the ends of said conductor bar windings at the ends of said rotor core.

3. In a method of manufacturing a squirrel cage winding assembly for a rotor core having a circumferential series of axial winding slots, the steps comprising: positioning said rotor core in an extrusion press having extrusion chambers communicating with opposite ends of said axial winding slots; placing a pair of hollow cylindrical slugs of electrically conductive material in said extrusion chambers with one slug adjacent to and abutting each end of said rotor core; heating said pair of hollow cylindrical slugs to a temperature below the melting point of said electrically conductive material for reducing the flow resistance; extruding said pair of hollow cylindrical slugs from said extrusion chambers axially into the opposite ends of said axial winding slots; and terminating said extruding when the extruded materials of said slugs are pressed together within said axial winding slots so as to form said conductor bar windings in each of said axial winding slots.

* * * * *